3,066,136
16β-(AMINO) CARBONYL ANDROSTANES AND
PROCESS FOR THE PREPARATION THEREOF
Pierre Crabbé, Mexico City, Mexico, assignor, by mesne assignments, to Syntex Corporation, a corporation of Panama
No Drawing. Filed Jan. 3, 1962, Ser. No. 164,148
19 Claims. (Cl. 260—239.5)

The present invention relates to novel cyclopentanophenanthrene derivatives and to a process for the production thereof.

More particularly, the present invention relates to novel 16β-(amino)carbonyl derivatives of the androstane series.

The novel compounds of the present invention which show a high anti-ovulatory activity and are also progestative, anti-estrogenic and anti-androgenic agents with antipyretic and non-narcotic analgesic properties are represented by the following formulas:

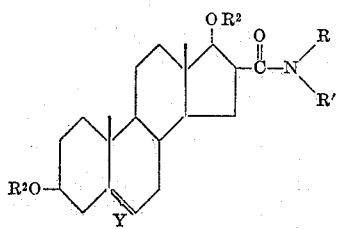

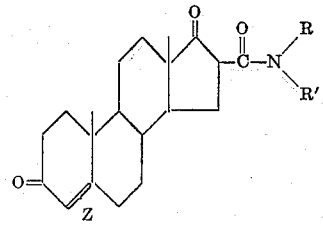

In the above formulas Z represents a double bond or a saturated linkage between C–4 and C–5; Y represents a double bond or a saturated linkage between C–5 and C–6; R and $R^1$ each represent hydrogen, a lower alkyl, amino lower alkyl, lower alkylamino lower alkyl, di-lower alkylamino lower alkyl, aryl or aralkyl group of up to 8 carbon atoms, R and $R^1$ together with the nitrogen represent a heterocycle such as piperidine, morpholine, piperazine or pyrrolidine which may or may not contain alkyl substituents; $R^2$ represents hydrogen or a hydrocarbon carboxylic acyl group containing less than 12 carbon aotms.

The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process illustrated by the following equation:

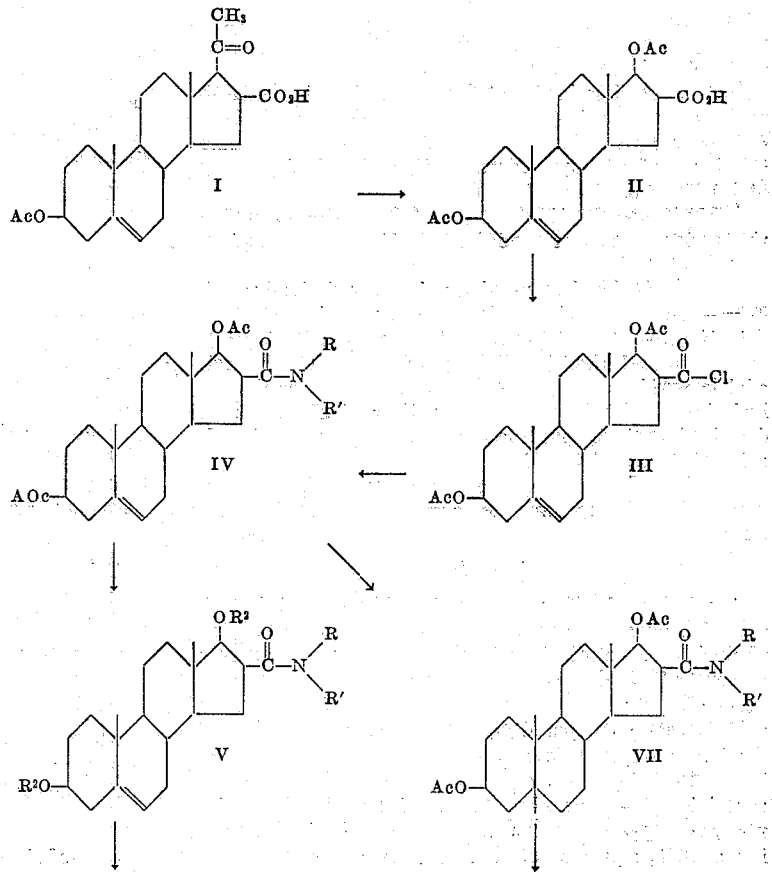

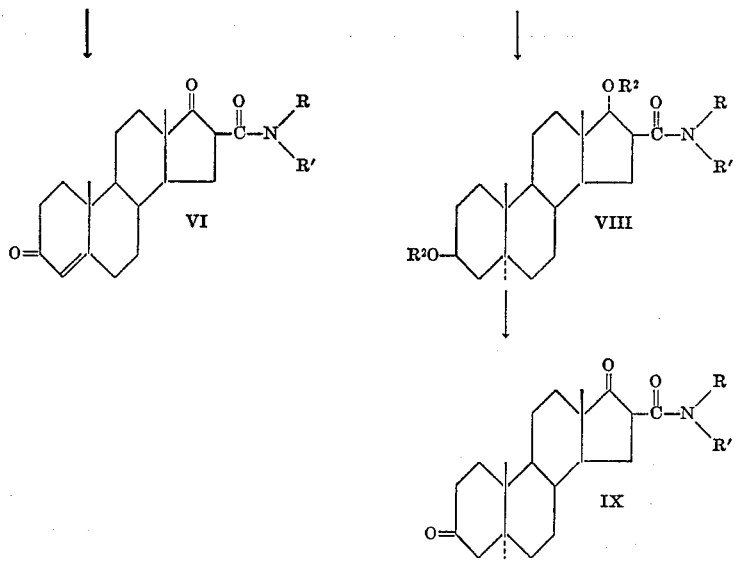

In the above formulas R, $R^1$ and $R^2$ have the same meaning as hereinbefore set forth.

In practicing the process outlined above, the starting $\Delta^5$-17α-pregnen - 3β - ol-20-one-16β-carboxylic acid 3-acetate (I) is treated with an organic peracid, such as trifluoroperacetic acid to give 5α,6α-oxido-androstan-3β, 17α-diol-16β-carboxylic acid 3,17-diacetate, which upon treatment under Cornforth conditions yields the corresponding $\Delta^5$-androsten derivative (II). Treatment of this compound with a suitable halogenating agent, preferably thionyl chloride, yields the corresponding 16β-carboxylic acid chloride (III) which upon reaction with ammonia or an amine, as for example diethylamine, piperidine or diethylaminoethylamine affords the corresponding 16β-(amino)carbonyl-3β,17α-diacetoxy - $\Delta^5$ - androstene derivative (IV). Hydrogenation of this compound in an organic solvent such as ethyl acetate in the presence of a suitable catalyst such as platinum oxide furnishes the respective 16β-(amino)carbonyl-3β,17α-diacetoxy androstene derivative (VII).

The above described 16β-(amino)-carbonyl-3β,17α-diacetoxy compounds (IV, VII) upon saponification in a mild alkaline medium, such as a potassium carbonate solution, afford the corresponding 3β,17α-dihydroxy derivatives (V, VIII; $R^2$=H).

Oxidation of the saturated diol (VIII; $R^2$=H) preferably under Oppenauer conditions yields the corresponding 3,17-dione (IX).

The 3β,17α-dihydroxy - $\Delta^5$ - androstene derivative (V; $R^2$=H) upon oxidation under the same conditions yields the respective $\Delta^4$-androstene-3,17-dione compound (VI).

The aforementioned 3,17-diols are conventionally acylated in pyridine with an acylating agent, such as the anhydride of a hydrocarbon carboxylic acid of the above described type, to give the corresponding 3β,17α-diacylates (V, VIII; $R^2$=acyl).

The following specific examples serve to illustrate but are not intended to limit the scope of the present invention:

*Example I*

A solution of trifluoro-peracetic acid prepared from 9 cc. of trifluoroacetic-anhydride such as described by Crabbé et al., Tetrahedron, 3, 279 (1958), was added over a period of 15 minutes and at room temperature to a solution of 3 g. of $\Delta^5$-17α-pregnen-3β-ol-20-one-16β-carboxylic acid 3-acetate (prepared by conventional acetylation of the free 3β-alcohol described by Romo, Tetrahedron, 3, 37 (1958)) in 50 cc. of anhydrous methylene chloride containing in suspension 24 g. of anhydrous disodio phosphate. Then, there was cautiously added with cooling a 10% aqueous solution of sodium carbonate followed by 200 cc. of ether. The organic layer was separated, dried and evaporated to dryness. The resulting residue after chromatography and crystallization of the solid fractions afforded 5α,6α-oxido-androstane-3β,17α-diol-16β-carboxylic acid-3,17-diacetate, which upon treatment with sodium iodide, sodium acetate and zinc dust in acetic acid (Cornforth et al. J. Chem. Soc., 112 (1959)) yielded $\Delta^5$-androstene-3β,17α-diol-16β-carboxylic acid-3,17-diacetate.

*Example II*

1 g. of the latter compound was dissolved in 50 cc. of benzene and treated with 2 g. of thionyl chloride.

The mixture was refluxed under anhydrous conditions for 2 hours. The solvent was evaporated under reduced pressure, the residue was again dissolved in 20 cc. of benzene and the solution evaporated to dryness, to make certain the total absence of thionyl chloride. The crude 16β-carboxylic acid chloride was treated with 2 cc. of diethylamine in 50 cc. of benzene. The reaction mixture was left overnight at room temperature, then an aqueous solution of sodium carbonate was added. The resulting emulsion was extracted with ether, the extract dried over sodium sulfate and evaporated to dryness. Crystallization from methanol-water afforded 16β-(diethylcarbamyl)-3β,17α-diacetoxy-$\Delta^5$-androstene.

*Example III*

1 g. of 3β,17α-diacetoxy-$\Delta^5$-androstene-16β-carboxylic acid was treated following the technique described in the foregoing example except that diethylamine was substituted by piperidine thus yielding 16β-(piperidino carbonyl)-3β,17α-diacetoxy-$\Delta^5$-androstene.

*Example IV*

Following the procedure described in Example II except that diethylamine was substituted by morpholine there was obtained 16β-(morpholino carbonyl)-3β,17α-diacetoxy-$\Delta^5$-androstene.

*Example V*

Using the same conditions described in Example II except that diethylamine was substituted by N,N-diethylamino-ethyl-amine there was obtained 16β-(N′,N′-diethylamino-ethyl-carbamyl)-3β,17α-diacetoxy-$\Delta^5$-androstene.

*Example VI*

Following the technique of Example II except that diethylamine was substituted by N-methylaniline there was obtained 16β-(N-methyl-N-phenyl carbamyl)-3β,17α-diacetoxy-$\Delta^5$-androstene.

*Example VII*

1 g. of 3β,17α-diacetoxy-$\Delta^5$-androstene-16β-carboxylic acid was treated with thionyl chloride in accordance with Example II. The 16β-carboxylic acid chloride thus obtained was dissolved in 50 cc. of benzene and 5 cc. of ammonium hydroxide were added. The formed precipitate was filtered off, washed with benzene and dried under vacuum. Recrystallization from alcohol-water afforded 16β-carbamyl-3β,17α-diacetoxy-Δ⁵-androstene.

*Example VIII*

A solution of 2.0 g. of the foregoing compound in 100 cc. of ethyl acetate was shaken with 100 mg. of platinum oxide catalyst in a hydrogen atmosphere until the gas uptake corresponded to one mol. The catalyst was filtered off and the filtrate evaporated to dryness. Recrystallization from acetone-hexane afforded 16β-carbamyl-3β,17α-diacetoxy-androstane.

When applying the above technique to the following starting compounds under I there were obtained the corresponding products under II.

| I | II |
|---|---|
| 16α - (diethylcarbamyl) - 3β,17α - diacetoxy - Δ⁵ - androstene | 16β - (diethylcarbamyl) - 3β,17α - diacetoxyandrostane |
| 16β - (piperidinocarbonyl)-3β,17α - diacetoxy - Δ⁵ - androstene | 16β - (piperidinocarbonyl)-3β,17α - diacetoxyandrostane |
| 16β - (morpholinocarbonyl)-3β,17α - diacetoxy - Δ⁵ - androstene | 16β - (morpholinocarbonyl)-3β,17α - diacetoxyandrostane |
| 16β - (N',N' - diethylaminoethylcarbamyl) - 3β,17α-diacetoxy - Δ⁵ - androstene | 16β - (N',N' - diethylaminoethylcarbamyl - 3β,17α-diacetoxyandrostane) |
| 16β - (N - methyl - N-phenylcarbamyl) - 3β,17α - diacetoxy - Δ⁵ - androstene | 16β - (N - methyl - N - phenylcarbamyl) - 3β,17α - diacetoxyandrostane |

*Example IX*

A suspension of 1 g. of 16β-carbamyl-3β,17α-diacetoxy-Δ⁵-androstene in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 16β-carbamyl-Δ⁵-androstene-3β,17α-diol.

The starting compounds under I were treated by the above technique, thus yielding the corresponding products under II.

| I | II |
|---|---|
| 16β-(diethylcarbamyl)-3β,17α-diacetoxy-Δ⁵-androstene | 16β-(diethylcarbamyl)-Δ⁵-androstene-3β,17α-diol |
| 16β-(piperidinocarbonyl)-3β,17α-diacetoxy-Δ⁵-androstene | 16β-(piperidinocarbonyl)-Δ⁵-androstene-3β,17α-diol |
| 16β-(morpholinocarbonyl)-3β,17α-diacetoxy-Δ⁵-androstene | 16β-(morpholinocarbonyl)-Δ⁵-androstene-3β,17α-diol |
| 16β-(N',N'-diethylaminoethylcarbamyl)-3β,17α-diacetoxy-Δ⁵-androstene | 16β-(N',N'-diethylaminoethylcarbamyl)-Δ⁵-androstene-3β,17α-diol |
| 16β-(N-methyl-N-phenylcarbamyl)-3β,17α-diacetoxy-Δ⁵-androstene | 16β-(N-methyl-N-phenylcarbamyl)-Δ⁵-androstene-3β,17α-diol |
| 16β-(diethylcarbamyl)-3β,17α-diacetoxyandrostane | 16β-(diethylcarbamyl)-androstane-3β,17α-diol |
| 16β-(piperidinocarbonyl)-3β,17α-diacetoxyandrostane | 16β-(piperidinocarbonyl)-androstane-3β,17α-diol |
| 16β-(morpholinocarbonyl)-3β,17α-diacetoxyandrostane | 16β-(morpholinocarbonyl)-androstane-3β,17α-diol |
| 16β-(N',N'-diethylaminoethylcarbamyl-3β,17α-diacetoxyandrostane | 16β-(N',N'-diethylaminoethylcarbamyl)-androstane-3β,17α-diol |
| 16β-(N-methyl-N-phenylcarbamyl)-3β,17α-diacetoxyandrostane | 16β-(N-methyl-N-phenylcarbamyl)-androstane-3β,17α-diol |
| 16β-carbamyl-3β,17α-diacetoxyandrostane | 16β-carbamyl-androstane-3β,17α-diol |

*Example X*

A solution of 1 g. of 16β-carbamyl-Δ⁵-androstene-3β,17α-diol in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvent removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 16β-carbamyl-Δ⁴-androstene-3,17-dione.

When applying the above technique to the starting compounds listed below, there were obtained the corresponding products hereinafter set forth.

| STARTING COMPOUNDS | PRODUCTS |
|---|---|
| 16β-(diethylcarbamyl)-Δ⁵-androstene-3β,17α-diol | 16β-(diethylcarbamyl)-Δ⁴-androstene-3,17-dione |
| 16β-(piperidinocarbonyl)-Δ⁵-androstene-3β,17α-diol | 16β-(piperidinocarbonyl)-Δ⁴-androstene-3,17-dione |
| 16β-(morpholinocarbonyl)-Δ⁵-androstene-3β,17α-diol | 16β-(morpholinocarbonyl)-Δ⁴-androstene-3,17-dione |
| 16β-(N',N'-diethylaminoethylcarbamyl)-Δ⁵-androstene-3β,17α-diol | 16β-(N',N'-diethylaminoethylcarbamyl)-Δ⁴-androstene-3,17-dione |
| 16β-(N-methyl-N-phenylcarbamyl)-Δ⁵-androstene-3β,17α-diol | 16β-(N-methyl-N-phenylcarbamyl)-Δ⁴-androstene-3,17-dione |
| 16β-(diethylcarbamyl)-androstane-3β,17α-diol | 16β-(diethylcarbamyl)-androstane-3,17-dione |
| 16β-(piperidinocarbonyl)-androstane-3β,17α-diol | 16β-(piperidinocarbonyl)-androstane-3,17-dione |
| 16β-(morpholinocarbonyl)-androstane-3β,17α-diol | 16β-(morpholinocarbonyl)-androstane-3,17-dione |
| 16β-(N',N'-diethylaminoethylcarbamyl)-androstane-3β,17α-diol | 16β-(N',N'-diethylaminoethylcarbamyl)-androstane-3,17-dione |
| 16β-(N-methyl-N-phenylcarbamyl)-androstane-3β,17α-diol | 16β-(N-methyl-N-phenylcarbamyl)-androstane-3,17-dione |
| 16β-carbamyl-androstane-3β,17α-diol | 16β-carbamyl-androstane-3,17-dione |

*Example XI*

A mixture of 1 g. of 16β-carbamyl-Δ⁵-androstene-3β,17α-diol, 4 cc. of pyridine and 2 cc. of propionic anhydride was kept at room temperature overnight, poured into ice water, the formed precipitate was filtered, washed with water and dried. Crystallization from acetone-hexane gave the 3,17-dipropionate of 16β-carbamyl-Δ⁵-androstene-3β,17α-diol.

By the same technique were treated the starting compounds under I to give the corresponding products under II.

| I | II |
|---|---|
| 16β-(diethylcarbamyl)-Δ⁵-androstene-3β,17α-diol | 3,17-dipropionate of 16β-(diethylcarbamyl)-Δ⁵-androstene-3β,17α-diol |
| 16β-(piperidinocarbonyl)-Δ⁵-androstene-3β,17α-diol | 3,17-dipropionate of 16β-(piperidinocarbonyl)-Δ⁵-androstene-3β,17α-diol |
| 16β-(morpholinocarbonyl)-Δ⁵-androstene-3β,17α-diol | 3,17-dipropionate of 16β-(morpholinocarbonyl)-Δ⁵-androstene-3β,17α-diol |
| 16β-(N',N'-diethylaminoethylcarbamyl)-Δ⁵-androstene-3β,17α-diol | 3,17-dipropionate of 16β-(N',N'-diethylaminoethylcarbamyl)-Δ⁵-androstene-3β,17α-diol |
| 16β-(N-methyl-N-phenylcarbamyl)-Δ⁵-androstene-3β,17α-diol | 3,17-dipropionate of 16β-(N-methyl-N-phenylcarbamyl)-Δ⁵-androstene-3β,17α-diol |
| 16β-(diethylcarbamyl)-androstane-3β,17α-diol | 3,17-dipropionate of 16β-(diethylcarbamyl)-androstane-3β,17α-diol |
| 16β-(piperidinocarbonyl)-androstane-3β,17α-diol | 3,17-dipropionate of 16β-(piperidinocarbonyl)-androstane-3β,17α-diol |
| 16β-(morpholinocarbonyl)-androstane-3β,17α-diol | 3,17-dipropionate of 16β-(morpholinocarbonyl)-androstane-3β,17α-diol |
| 16β-(N',N'-diethylaminoethylcarbamyl)-androstane-3β,17α-diol | 3,17-dipropionate of 16β-(N',N'-diethylaminoethylcarbamyl)-androstane-3β,17α-diol |
| 16β-(N-methyl-N-phenylcarbamyl)-androstane-3β,17α-diol | 3,17-dipropionate of 16β-(N-methyl-N-phenylcarbamyl)-androstane-3β,17α-diol |
| 16β-carbamyl-androstane-3β,17α-diol | 3,17-dipropionate of 16β-carbamyl-androstane-3β,17α-diol |

*Example XII*

Following the technique described in the foregoing example there were treated the starting compounds mentioned in said example except that propionic anhydride was substituted by caproic anhydride, cyclopentyl propionic anhydride and benzoyl chloride, thus affording the corresponding 3,17-dicaproates, 3,17-dicyclopentylpropionates and 3,17-dibenzoates thereof.

I claim:
1. A compound of the following formula:

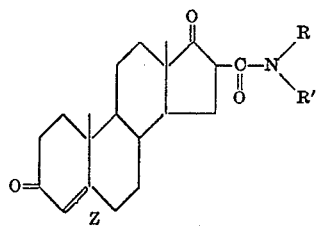

wherein Z is a member of the group consisting of a double bond and a saturated linkage between C–4 and C–5; R and $R^1$ are selected from the group consisting of hydrogen, a lower alkyl, an amino lower alkyl, a lower alkylamino lower alkyl, a dilower alkylamino lower alkyl, an aryl and an aralkyl group containing up to 8 carbon atoms and R and $R^1$ together with the nitrogen atom form a heterocyclic radical selected from the group consisting of piperidino, morpholino, pyrrolidino and piperazino.

2. 16β-carbamyl-$\Delta^4$-androstene-3,17-dione.
3. 16β-(diethyl carbamyl)-$\Delta^4$-androstene-3,17-dione.
4. 16β-(N-methyl-N-phenyl carbamyl)-$\Delta^4$-androstene-3,17-dione.
5. 16β-(piperidino carbonyl)-$\Delta^4$-androstene-3,17-dione.
6. 16β-carbamyl-androstane-3,17-dione.
7. 16β-(diethyl carbamyl)-androstane-3,17-dione.
8. 16β - (N',N' - diethylaminoethyl carbamyl) - androstane-3,17-dione.
9. 16β-(morpholino carbonyl)-androstane-3,17-dione.
10. A compound of the following formula:

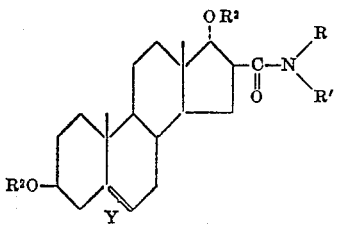

wherein Y is a member of the group consisting of a double bond and a saturated linkage between C–5 and C–6; R and $R^1$ are selected from the group consisting of hydrogen, a lower alkyl, an amino lower alkyl, a lower alkylamino alkyl, a di-lower alkylamino alkyl, an aryl and an aralkyl group containing up to 8 carbon atoms and R and $R^1$ together with the nitrogen form a heterocyclic radical selected from the group consisting of piperidino, morpholino, pyrrolidino, and piperazino; and $R^2$ is selected from the group consisting of hydrogen and a hydrocarbon carboxylic acyl group of less than 12 carbon atoms.

11. 16β-carbamyl-$\Delta^5$-androstene-3β,17α-diol.
12. 16β-(diethyl carbamyl)-$\Delta^5$-androstene-3β,17α-diol.
13. 16β-(N-methyl-N-phenyl carbamyl)-$\Delta^5$-androstene-3β,17α-diol.
14. 16β-(piperidino carbonyl)-$\Delta^5$-androstene-3β,17α-diol.
15. 16β-carbamyl-androstane-3β,17α-diol.
16. 16β-(diethyl carbamyl)-androstane-3β,17α-diol.
17. 16β-(N',N'-diethylaminoethyl carbamyl) - androstane-3β,17α-diol.
18. 16β-(morpholino carbonyl)-androstane-3β,17α-diol.
19. A process for the production of 16β-(amino)-carbonyl androstane derivatives which comprises treating the corresponding 16β-carboxylic acid with a suitable halogenating agent, thereafter reacting the thus formed acid halide with an amine selected from the group consisting of ammonia, a lower alkyl amine, a lower dialkyl amine, a lower alkylene amine, an arylamine and an aralkylamine each containing up to 8 carbon atoms, morpholine, piperidine, piperazine and pyrrolidine.

No references cited.